United States Patent Office 3,024,680
Patented Mar. 13, 1962

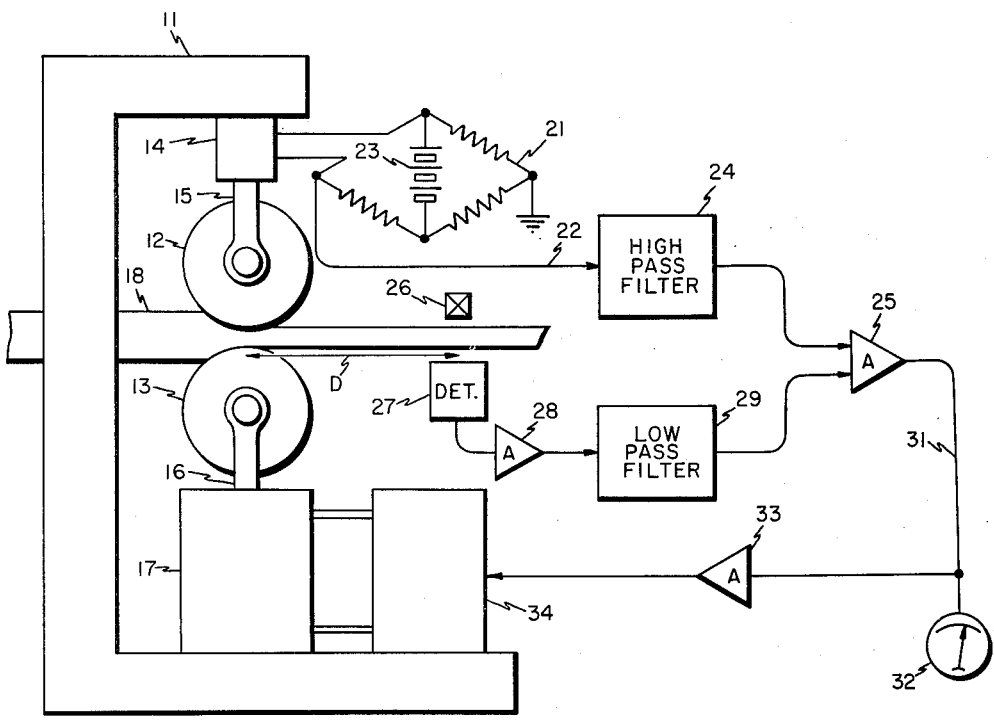

3,024,680
PROCESS MEASUREMENT AND CONTROL
Richard F. Warren and Philip Spergel, Columbus, Ohio, assignors to Industrial Nucleonics Corporation, a corporation of Ohio
Filed June 2, 1958, Ser. No. 739,173
7 Claims. (Cl. 80—56)

This invention relates generally to control and measurement of industrial processes and more particularly to such processes which involve a continuous moving sheet or web of material which is to be controlled in transverse dimension in accordance with a setting of the opposed rollers of a rolling mill.

Various processes are in use which involve the continuous transportation of the material being processed while subjecting it to one or more forming operations at various stations along the line of travel. A particular example of this type of industrial process is presented by the cold rolling of steel from a comparatively thick piece of stock into a long thin sheet. Continuous reduction in the thickness of the material is achieved by passage of the stock through a succession of rollers. The final thickness of the stock is determined by controlling the setting of the rollers through which the material passes. This setting can be adjusted by means well known in the art for achieving the desired result. In order to obtain a uniform thickness in the finished product it is conventional practice to automatically control the separation of the rollers which determine the amount of reduction in thickness of the moving material.

Prior art arrangements for the control of the spacing of the thickness determining members are known. Such a system may be that disclosed in U.S. application, Serial No. 657,434, filed May 6, 1957, by Richard F. Warren for Control Apparatus, now Patent No. 2,999,406, which employs a radiation absorption type sensing system for measuring the thickness of the material and wherein the signals representative of the measured thickness are used for controlling the separation of the rolls. Other arrangements employing a form of strain gauge in the roll supporting structure have been used to regulate the spacing of the rolls in accordance with the force with which the rolls are required to bear against the moving material. Each of these prior art measurement and control systems is subject to disadvantages which are inherent in the particular form of measurement which is employed. For example, the radiation type thickness gauges provide good low frequency response and accurate measurement of slow variations of the thickness of the material; but such gauges are relatively insensitive to high frequency signals and thus fail properly to respond to small variations in the longitudinal direction of the thickness of the material, especially when a high-speed rolling process is involved. The strain gauge type of thickness measurement, on the other hand, is accurately responsive to high frequency variations and readily generates signals faithfully representing the short term irregularities in the thickness as it passes through the rolls. The strain gauge, though, is subject to serious limitations with respect to long term changes which would be represented by low frequency signals in the thickness measurement output.

The present invention employs the principle of complementary filtering action to combine two signals representative of substantially the same quantity for the purposes of obtaining, as the combined signal, an accurate representation of that quantity free of the imperfections inherent in the individual sensing devices used to detect the quantity.

It is an object of the present invention to overcome the disadvantages present in the prior art arrangements for measuring and controlling a continuous process involving forming moving material.

A further object of this invention is to provide a process control system which is responsive to high and low frequency signals representative of a variation in a characteristic of the material.

Another object of this invention is to provide a measuring and control system that overcomes the inherent disadvantages of the prior art system, but nonetheless is relatively inexpensive and readily incorporable in said systems.

Still another object of this invention is to provide a measurement and control system composed of two sensing devices each of which measures substantially the same quantity, but the signals of which are combined in a manner to take advantage of the inherent advantages of the individual sensing devices.

These and other advantages of the present invention will be apparent from the following detailed description of a single preferred embodiment thereof taken in conjunction with the accompanying drawing in which the single FIGURE shows a schematic representation of a steel rolling mill having the spacing between rollers controlled in accordance with the teachings of this invention.

Referring now to the drawing, a schematic representation of a rolling stage in a steel rolling mill is shown, comprising a relatively massive mill housing 11 for supporting a pair of rollers 12, 13 in opposed position with predetermined spacing therebetween. The upper roller 12 may be supported in operable relation to a strain gauge 14 or other suitable device for determining the compressive force in the member 15 supporting roller 12. The roller 13 is shown supported on a vertically movable member 16 which is indicated as being hydraulically controlled from a cylinder and piston assembly 17. It is to be understood that this showing for the vertical adjustment of the roller 13 is merely schematic and intended to represent any conventional means for adjusting the spacing between the rollers 12 and 13 such as hydraulic, mechanical or electrical control. During the operation of the rolling mill a sheet of steel or similar material 18 continuously passes between the rolls 12 and 13 with the transverse dimension of the material 18 altered by the action of the rolls thereon.

The thickness measurement in accordance with the present invention is accomplished first by sensing the signals derived by the strain gauge 14 in a suitable bridge arrangement 21. The strain gauge elements constitute the impedance in one of the legs of the bridge and produce an output signal at the lead 22 proportional to the change in thickness of the material 18 with respect to the spacing of the rolls 12 and 13. The signal variations representative of thickness change that appear on line 22 are a result of the unbalance of the bridge 21 by the change in resistance of element 14. The source of bridge voltage is available from a battery 23 or equivalent D.C. voltage supply. This signal is applied to a high pass filter 24 from which it passes to the input of summing amplifier 25.

A second means for sensing the thickness dimension of the material 18 is provided by a radioactive source 26 and detector 27 for radioactive penetrative radiation. This arrangement may comprise any well known thickness gauge of the type employing radiation which is absorbed in accordance with the mass per unit area of the material through which it passes. The radiation detected by the detector 27 is suitably amplified in an amplifier 28 and applied to the input of the low pass filter 29. The output of the low pass filter 29 is applied to a second input of the amplifier 25. The amplifier 25 adds the two signals applied to the inputs thereof and produces at its output lead 31 a signal proportional to the sum of the two inputs.

This signal accurately represents the thickness dimension of the material 18 as will hereinafter be described. The signal on the lead 31 can be applied to a thickness indicator 32 and, if desired, applied to a servo amplifier 33 which controls the operation of a servo motor 34 operating the roll displacement means 17. The servo mechanism 33 and 34 is adapted to control the displacement of the roll 13 by means of the displacement motor 17 in accordance with well known automatic control practice. The roll 13 is moved in a direction to compensate for the change sensed by the sensing device 14 and sensing system 26 and 27.

For proper operation the filters 24 and 29 of the present invention are arranged to provide complementary filtering action. The filter 24 which is represented as a high pass filter may comprise a series capacitance and shunt resistance to provide a transfer function of the type expressed by the fraction $$\frac{j\omega RC}{1+j\omega RC}$$

The filter 29 is a low pass filter which may also be characterized by the use of series resistance and shunt capacitance to introduce a transfer function into the signal line of the type expressed by the fraction $$\frac{1}{1+j1RC}$$

Ordinarily the combination of the outputs of the filters 24 and 29 for the same input signal would produce a composite signal which is identical with the signal when combined at the output of the amplifier 25. This would result since the frequency components of the signal which are attenuated in one filter are not attenuated in the other, and vice versa, thereby producing a uniform frequency and phase characteristic. However, the signals representative of the thickness of the material 18 as derived by the transducer 14 and the absorption gauge 26, 27 are subject to perturbations which are beyond the capability of the particular signal channel associated with each sensing device to translate. The filters 24 and 29 are accordingly tailored to eliminate the effect of such components from the respective channels and pass only those components which the channel capability permits to be faithfully reproduced. In order to properly combine these two signals the effect of the phase lag introduced by the spacing between the point of application of pressure by the rolls 12, 13 and the position of source-detector combination 26, 27 must be accounted for. This spacing is designated as the distance D in the longitudinal direction of the moving material 18.

The transportation lag introduced by the spacing D is effectively in series with the channel including low pass filter 29 and modifies the transfer function by multiplying the filter transfer function by a delay factor of $e^{-j\omega a}$ where "$a$" is the transportation time for moving material 18 the distance D. The transfer function for the low pass channel including the effects of the spacing D and the response characteristic of the filter 29 is therefore $$\frac{e^{-j\omega a}}{1+j\omega RC}$$

For the filters 24, 29 to operate in a complementary manner, the time constant represented by the product RC for each filter should be equal. With equal time constants in the filters 24, 29, and by properly selecting the magnitude thereof in relation to any given transportation time "$a$," an effective transfer function for the net signal for the two channels can be expressed as $$E_0 = E_1 \left[ \frac{1}{j\omega RC+1}(j\omega RC + e^{-j\omega a}) \right]$$

This function will have unity magnitude and very nearly zero phase shift for the band width of signals encountered. Accordingly, the output of amplifier 25 will provide an accurate signal representative of the thickness of the material 18 with the frequency response deficiencies of the individual sensing elements effectively removed by the filtering action herein described.

While this invention has been described with respect to a single particular example as a preferred embodiment thereof it is to be understood that it may be readily adapted to related processes for handling continuously moving material and accordingly is not to be limited to the particular disclosure contained herein.

What is claimed is:

1. In a continuous process system, apparatus for measuring a characteristic of moving material processed by said system comprising first and second sensing devices for transducing said characteristic into respective electrical signals representative of said characteristic, said first device producing a signal having high frequency components accurately representative of rapid variations in said characteristic, said second device producing a signal having low frequency components accurately representative of slow variations in said characteristic, a high pass filter for signals from said first device, a low pass filter for signals from said second device, means for combining the output signals from said filters to produce a combined signal containing said high and low frequency components accurately representative of said rapid and slow variations, and utilization means responsive to said combined signal.

2. Control apparatus according to claim 1 in which said utilization means includes a servo amplifier and means responsive to said servo amplifier for controlling said characteristic.

3. In a continuous process system, apparatus for measuring the effective thickness of moving material processed by said system comprising a mechanical thickness sensing device for generating a first electric signal representative of the thickness of said material, a radiation type gauge for sensing the weight per unit irradiated area of said material and generating a second electric signal corresponding thereto, a high pass filter for said first signal, a complementary low pass filter for said second signal, means for combining the output signals from said filters to produce a combined signal containing the frequency components of said first and second signals respectively passed by said filters, and utilization means responsive to said combined signal.

4. Control apparatus according to claim 3 in which said utilization means includes a servo amplifier and means responsive to said servo amplifier for controlling the thickness of said material.

5. In a continuous rolling mill, apparatus for measuring the thickness of the material being rolled comprising a pair of spaced rolls for rolling said material, means responsive to force variations on said rolls for producing a first electric signal representative of variations in thickness of said material, a radiation type gauge for sensing the weight per unit irradiated area of said material and producing a second electric signal corresponding thereto, a high pass filter for said first signal, and a complementary low pass filter for said second signal, means for combining the output signals from said filters to produce a combined signal containing the frequency components of said first and second signals respectively passed by said filters, and utilization means responsive to said combined signals.

6. Apparatus according to claim 5 in which said rolls and said gauge are spaced a predetermined distance along the direction of travel of said material with said gauge sensing said material subsequent to passing through said rolls and said distance being selected in relation to the time constant of said filters to provide a substantially unity transfer function for said combined signal.

7. Control apparatus according to claim 5 in which said utilization means includes a servo amplifier and means responsive to said servo amplifier for controlling the spacing between said rolls.

References Cited in the file of this patent

UNITED STATES PATENTS

| | | |
|---|---|---|
| 2,176,742 | Pierre | Oct. 17, 1939 |
| 2,264,096 | Mohler | Nov. 25, 1941 |
| 2,264,725 | Shoupp | Dec. 2, 1941 |
| 2,332,288 | Zeitlin | Oct. 19, 1943 |
| 2,659,154 | Rendel | Nov. 17, 1953 |
| 2,735,051 | Gille | Feb. 14, 1956 |
| 2,851,911 | Hessenberg | Sept. 16, 1958 |